United States Patent
Valli

[15] 3,685,494
[45] Aug. 22, 1972

[54] APPARATUS FOR COLLECTING AND CONVEYING EGGS

[72] Inventor: Roberto Valli, Via IV Novembre n.1/4, Galeata, Italy

[22] Filed: Oct. 16, 1970

[21] Appl. No.: 81,478

[30] Foreign Application Priority Data

Oct. 20, 1969 Italy.....................6515 A/69

[52] U.S. Cl. ..........................119/48, 24/171, 74/84, 198/135
[51] Int. Cl. ...............................................A01k 5/00
[58] Field of Search ....119/48, 22; 24/135, 263, 171; 198/135

[56] References Cited

UNITED STATES PATENTS

| | | |
|---|---|---|
| 1,958,531 | 5/1934 | Burling.......................24/171 |
| 2,961,879 | 11/1960 | Hudson....................98/135 X |
| 3,498,267 | 3/1970 | Leeming......................119/48 |

Primary Examiner—Aldrich F. Medbery
Attorney—Robert E. Burns and Emmanuel J. Lobato

[57] ABSTRACT

An apparatus for collecting eggs from a poultry battery and conveying the eggs to a collecting platform comprises an endless belt extending between two spaced idler rollers and gripping means for drawing the belt in a direction such that eggs on the conveyor belt are conveyed from a position adjacent a battery to a collecting platform and releasing the belt when the gripping means is moved in the opposite direction.

5 Claims, 2 Drawing Figures

PATENTED AUG 22 1972 3,685,494

APPARATUS FOR COLLECTING AND CONVEYING EGGS

BACKGROUND OF THE INVENTION

This invention relates to apparatus for collecting eggs from a battery and conveying the eggs to a collecting platform.

It has been found, that at present, in batteries for aviculture breeding, the eggs cannot be conveyed and collected in a functional and economical manner such as to allow a ready and reliable management of the breeding. This situation is responsible for many breeders not adopting any collecting system or resorting to such systems which are quite complex and expensive. Manual collection is very expensive and inefficient. In the case where complex systems are adopted a very high investment is required as well as a high maintenance cost, since the need arises for skilled personnel capable of managing such highly complex systems.

Apparatus is known which includes a conveyor belt longitudinally arranged throughout the length of the battery, which is some cases may be as long as 80-100 meters. The eggs, as laid by the hens accommodated within the side-by-side cages forming the entire battery, reach the belt by rolling.

This conveyor belt is carried by two rollers, at least one of which is a driving roller, which rollers are located at the two ends of the battery, respectively.

Each driving roller is operated by an independent electric motor by suitable drive and speed reduction systems.

These known systems have substantial drawbacks, the main drawbacks of which are:

a. slippage in the conveyor belt due to the elongations in the conveyor belt which in the systems as long as 80-100 meters may be in the order of 1 percent, elongations which are due to the humidity in the environments in which the batteries are located:

b. the difficulty in centering and balancing the conveyor belts;

c. the uncapability of operating in case of electric energy failure.

AIMS OF THE INVENTION

It is the main object of the present invention to obviate the above mentioned drawbacks and particularly to provide for the sliding of the conveyor belt independently of any elongations said conveyor belt may be subjected to.

A further object of the invention is to provide a very simple apparatus not requiring any independent electric motors and stretching devices for the belt and such as to be applicable both to relatively small as well as extensive breeders.

A further object of the invention is to operate the conveyor belt by poultry feed distributing trolleys sliding on the batteries or adjacent the same.

A further but not last object of the present invention is to provide for collecting the eggs even in case of electric or mechanical energy failure.

According to the present invention, an apparatus for collecting eggs from a battery and conveying interconnected to a collecting platform, comprising an endless conveyor extending from a position adjacent one end of the battery where eggs from the battery can roll onto the conveyor, to the collecting platform, the conveyor being arranged over two spaced idler rollers, and movable means adapted to grip a portion of the conveyor between the idler rollers and draw the conveyor in a first sense parallel with the longitudinal axis of the conveyor for conveying eggs on the conveyor to the collecting platform.

Preferably, the movable gripping means gripe the conveyor after an initial movement of the gripping means in the first sense, further movement of the gripping means in the first sense causing the conveyor to be drawn by the gripping means movement of the gripping means in the opposite sense causing the gripping means to release the portion of the conveyor.

In a preferred embodiment, the gripping means comprises a member having spaced parallel flanges interconnected by a web to define a channel section, the web extending beneath a part of the conveyor between the rollers and the flanges being arranged adjacent opposite side edges of the conveyor, each flange having an elongate slot, the longitudinal axis of which slot extends at an angle to the plane containing said part of the conveyor, and a spindle extending between the flanges and mounted for sliding movement in the slots whereby movement of the member in the first sense causes the spindle to move relative to the slots so that a part of the conveyor between the flanges is gripped between the spindle and the web.

The gripping means may be electrically controlled.

DESCRIPTION OF THE FIGURES OF THE DRAWING

An apparatus according to the present invention will now be described and shown in more detail in accordance with an embodiment, given by way of example, reference being made to the Figures of the accompanying drawing, in which.

DESCRIPTION OF A PREFERRED EMBODIMENT

Figure 1:
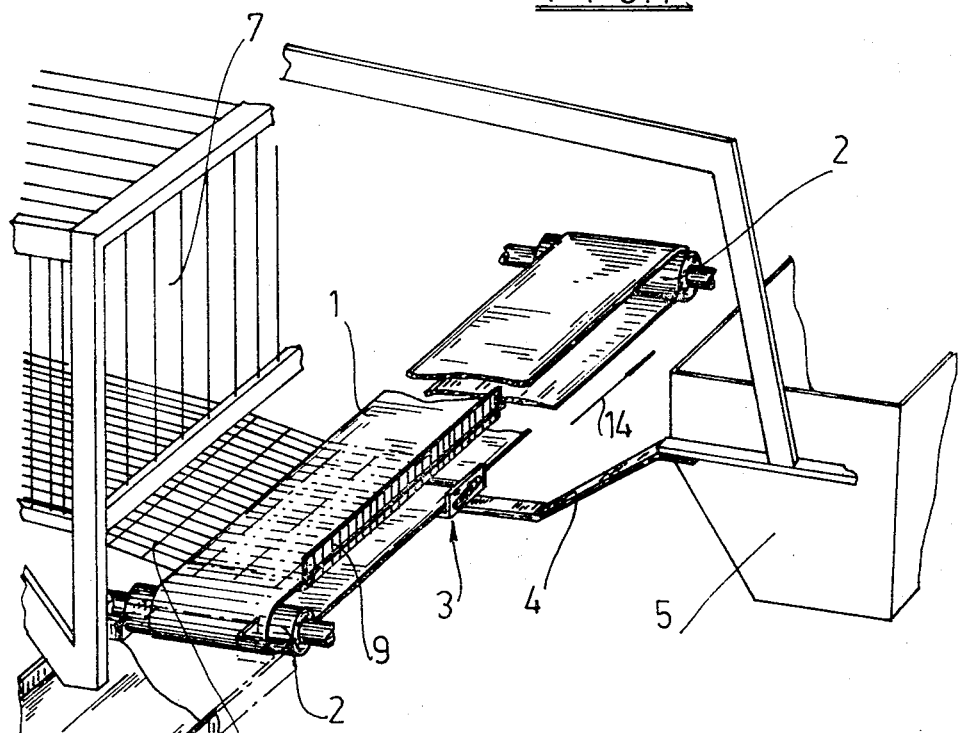
FIG. 1 is a perspective diagrammatic view showing an apparatus for egg collection and conveyance.

As shown, a conveyor belt 1 is wound around two idler rollers 2 located adjacent one end of an aviculture breeding battery 7 (partly shown).

Within a notch or recess in the conveyor belt 1, as long as the width of the battery 7, there is accommodated, a grill 8 which is effective as an inclined plane for permitting eggs in the battery 7 to slide thereon from inside the cages forming the battery.

The grill 8 terminates in a side board 9 which prevents the eggs from falling down over the side of the conveyor belt 1.

Figure 2:
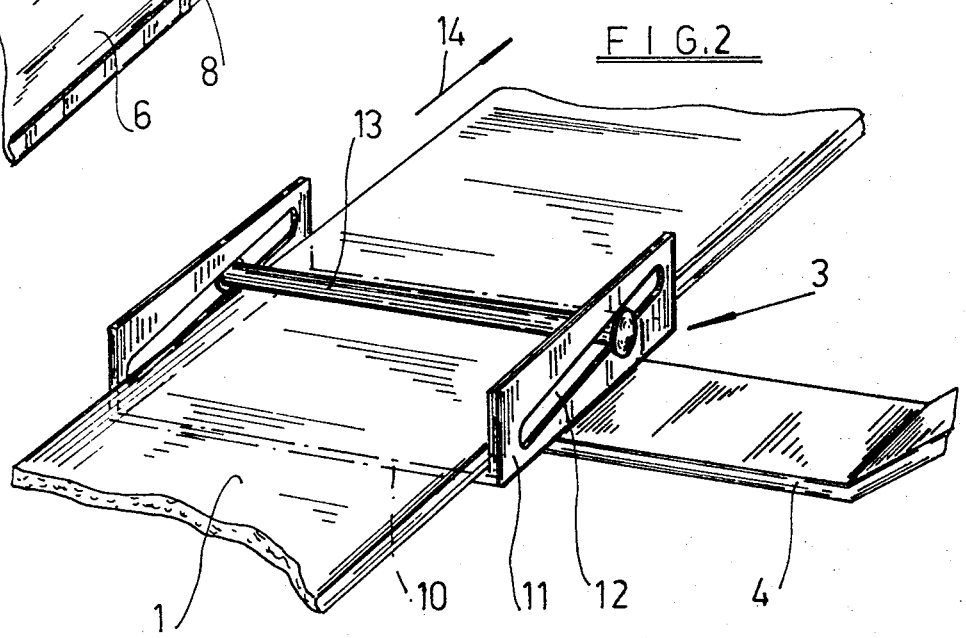
FIG. 2 is a perspective diagrammatic view showing an automatic mechanical gripping means for the conveyor belt of Fig. 1.

An automatic mechanical gripping means 3 for the conveyor belt 1 is better shown in FIG. 2, and comprises a web 10 as wide as the belt and provided with two opposed side flanges 11, each having an oblique slot 12. A pin or spindle 13 can slide within said slots 12, the conveyor belt passing under said pin or spindle 13. The automatic gripping means 3 is carried by a bar 4 which is made fast with a poultry feed distributing trolley 5. An egg collecting platform 6 is shown at the left-hand end of the conveyor belt 1 as seen in FIG. 1.

The operation of the conveyor belt 1 is as follows: by moving the poultry feed distributing trolley 5 in the direction indicated by arrow 14, the conveyor belt 1 is locked between said pin or spindle 13 and web 10 and, as a result, said conveyor belt is driven and the eggs on the upperside of the belt are conveyed on the collecting platform 6.

When the movement for the poultry feed distributing trolley is reversed, said pin or spindle 13 is lifted and as a result the locking of the conveyor belt 1 is released, the belt remaining therefore stationary.

In its practical embodiment the invention may take also forms differing from those above described and shown; thus, for example, the automatic mechanical gripping means shown for the egg conveyor belt may be substituted by another device, such as electrically controlled pliers or other technically equivalent means, while remaining unaltered the inventive concept of providing movement of the conveyor belt by drawing.

Moreover, the gripping device could be carried by other power operated driving element or other driving element operating on the batteries or outward of the same, without departing for this from the covering scope of the present invention as defined by the claims.

What is claimed is:

1. An apparatus for collecting eggs from a poultry battery and conveying the eggs to a collecting platform, comprising conveyor means extending from a position adjacent one end of the battery where eggs from the battery can roll onto the conveyor, to the collecting platform, the conveyor means including two spaced idler rollers and an endless conveyor belt extending over said rollers, and movable one way drive means for gripping a portion of the endless belt when moved in a first direction and located between the idler rollers to draw the conveyor belt in a first direction parallel with the longitudinal axis of the endless belt for conveying eggs on the belt to the collecting platform and said movable drive means having means to release the belt when moved in an opposite direction.

2. An apparatus for collecting eggs from a poultry battery and conveying the eggs to a collecting platform, comprising an endless conveyor belt extending from a position adjacent one end of the battery where eggs from the battery can roll onto the conveyor, to the collecting platform, two spaced idler rollers, the conveyor belt being arranged over the idler rollers, and movable gripping means for gripping the conveyor after an initial movement of the gripping means in a first sense parallel to the longitudinal axis of the conveyor belt, further movement of the gripping means in the first direction, causing the conveyor belt to be drawn by the gripping means in said first direction for conveying eggs on the conveyor to the collecting platform, and means on said movable gripping means for causing the gripping means to release the conveyor belt on movement in an opposite direction.

3. An apparatus according to claim 2, wherein a feed distributing trolley is provided, which trolley is arranged to move parallel with the longitudinal axis of the conveyor, the gripping means being mounted for movement on the trolley.

4. An apparatus according to claim 2, wherein the gripping means includes a member having spaced parallel flanges interconnected by a web to define a channel section, the web extending beneath a part of the conveyor belt between the idler rollers, the flanges being arranged adjacent opposed side edges of the conveyor, each flange having an elongate slot formed therein, the longitudinal axis of each slot extending at the same angle to the plane containing said part of the conveyor, and a spindle extending between the flanges and mounted for sliding movement in the slots, movement of the member in the first sense causing the spindle to move relative to the slots so that a part of the conveyor belt between the flanges is gripped between the spindle and the web.

5. An apparatus according to claim 2, wherein the gripping means is electrically controlled.

* * * * *